United States Patent
Cho et al.

(10) Patent No.: US 9,903,727 B2
(45) Date of Patent: Feb. 27, 2018

(54) METHOD AND NAVIGATION DEVICE FOR PROVIDING GEO-FENCE SERVICES, AND COMPUTER-READABLE MEDIUM STORING PROGRAM FOR EXECUTING THE SAME

(71) Applicant: Hyundai Motor Company, Seoul (KR)

(72) Inventors: Jae Kyu Cho, Gyeonggi-do (KR); Nam Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 5 days.

(21) Appl. No.: 14/965,283

(22) Filed: Dec. 10, 2015

(65) Prior Publication Data

US 2017/0108346 A1 Apr. 20, 2017

(30) Foreign Application Priority Data

Oct. 19, 2015 (KR) .......................... 10-2015-0145308

(51) Int. Cl.
| | | |
|---|---|---|
| G01C 21/00 | (2006.01) | |
| G01C 21/34 | (2006.01) | |
| G01C 21/36 | (2006.01) | |
| H04W 4/02 | (2018.01) | |

(52) U.S. Cl.
CPC ..... G01C 21/3415 (2013.01); G01C 21/3461 (2013.01); G01C 21/3667 (2013.01); G01C 21/3697 (2013.01); H04W 4/021 (2013.01)

(58) Field of Classification Search
CPC .......... G01C 21/00; G01C 21/34; H04W 4/02
USPC ............... 701/26, 426, 430, 533; 340/426.1, 340/426.18, 426.19
See application file for complete search history.

(56) References Cited

U.S. PATENT DOCUMENTS

| | | | | |
|---|---|---|---|---|
| 8,653,956 B2* | 2/2014 | Berkobin | ............... | G08G 1/207 |
| | | | | 340/426.1 |
| 9,008,888 B1* | 4/2015 | Gravino | ............. | G01C 21/3682 |
| | | | | 701/26 |
| 9,215,560 B1* | 12/2015 | Jernigan | ............... | H04W 4/021 |
| 9,369,842 B2* | 6/2016 | Cronin | ................. | H04W 4/021 |
| 9,473,890 B1* | 10/2016 | Liu | ........................ | G01S 5/0284 |
| 2014/0067564 A1* | 3/2014 | Yuan | .................. | G06Q 30/0633 |
| | | | | 705/16 |
| 2016/0223347 A1* | 8/2016 | Ricci | ...................... | G01C 21/34 |

FOREIGN PATENT DOCUMENTS

| | | |
|---|---|---|
| JP | 2007-163349 | 6/2007 |
| JP | 2007-316033 | 12/2007 |
| JP | 2010-525346 | 7/2010 |
| JP | 2010-243367 | 10/2010 |

(Continued)

*Primary Examiner* — Thomas G Black
*Assistant Examiner* — Wae L Louie
(74) *Attorney, Agent, or Firm* — Mintz Levin Cohn Ferris Glovsky and Popeo, P.C.; Peter F. Corless

(57) ABSTRACT

A method for providing a geo-fence service using a map provided via a navigation device includes: searching for at least one critical route from a current position of a vehicle or an origin to a destination mapped onto the map; displaying a first critical route onto the map along the vehicle can travel to the destination, the first critical route corresponding to a shortest route among the at least one searched critical route; and determining whether the vehicle deviates from a geo-fence area including the at least one searched critical route.

18 Claims, 5 Drawing Sheets

(56) References Cited

FOREIGN PATENT DOCUMENTS

| | | |
|---|---|---|
| JP | 2014-522599 A | 9/2014 |
| KR | 10-2002-0002954 A | 2/2002 |
| KR | 10-2012-0103816 A | 9/2012 |
| KR | 10-1297909 | 8/2013 |
| KR | 10-2014-0015527 A | 2/2014 |
| KR | 10-2014-0021027 A | 2/2014 |
| KR | 10-2014-0053140 A | 5/2014 |
| KR | 10-2015-0048285 A | 5/2015 |
| WO | WO-2014/073141 | 5/2014 |

\* cited by examiner

METHOD AND NAVIGATION DEVICE FOR PROVIDING GEO-FENCE SERVICES, AND COMPUTER-READABLE MEDIUM STORING PROGRAM FOR EXECUTING THE SAME

CROSS-REFERENCE TO RELATED APPLICATION

This application claims the benefit of and priority to Korean Patent Application No. 10-2015-0145308, filed on Oct. 19, 2015, which is hereby incorporated by reference as if fully set forth herein.

BACKGROUND OF THE DISCLOSURE

Technical Field

The present disclosure relates generally to geo-fence technology and, more specifically, to a method and a navigation device for providing geo-fence services with high accuracy and a computer-readable medium storing a program for executing the same.

Discussion of the Related Art

Geo-fence technology refers to technology for storing position information of an object, such as a vehicle, when the object deviates from an area predetermined by a user (i.e., geo-fence range) and for notifying the user that the object has deviated from the geo-fence range based on the stored position information. When the object corresponds to a vehicle, the geo-fence technology can induce a driver not to exit a predetermined protection area by pre-notifying the driver of the protection area.

Conventional geo-fence technology sets an area with a predetermined radius from a specific point as a geo-fence area 1, as shown in FIG. 1, or sets an area defined by connecting a plurality of specific points as a geo-fence area 2, as shown in FIG. 2, and issues a warning only when a vehicle deviates from the geo-fence area. However, the conventional geo-fence technology may set an area unrelated to a route between an origin and a destination as a geo-fence area. In such case, the original purpose of geo-fencing may be negated.

SUMMARY OF THE DISCLOSURE

An object of the present disclosure is to provide geo-fence services to set a geo-fence area according to multiple searched critical routes from an origin, or a current location, of a vehicle to a destination and to recognize whether the vehicle has deviated from the geo-fence area, and a computer-readable medium storing a program for executing the same. For simplification, the term "critical route" may be referred to herein, alternatively, as a "route."

According to embodiments of the present disclosure, a method for providing geo-fence services of a map through a navigation device includes: A method for providing a geo-fence service using a map provided via a navigation device, comprising: searching for at least one critical route from a current position of a vehicle or an origin to a destination mapped onto the map; displaying a first critical route onto the map along the vehicle can travel to the destination, the first critical route corresponding to a shortest route among the at least one searched critical route; and determining whether the vehicle deviates from a geo-fence area including the at least one searched critical route.

The map may be received from a synchronized server.

The at least one critical route may be searched within a range of a target arrival time to the destination.

The destination and the target arrival time may be input through a user interface and set to the map.

The destination and the target arrival time may be received from a terminal through short range communication and set to the map.

The determining of whether the vehicle deviates from the geo-fence area may include generating a warning, information about a position at which the vehicle deviates, and excess time information about an estimated time of arrival when the vehicle deviates from the geo-fence area.

The warning may be displayed on a display screen, and the information about the position at which the vehicle deviates and the excess time information may be transmitted to the terminal.

The method may further include re-searching for at least one critical route for the vehicle when the vehicle deviates from the geo-fence area.

The geo-fence area may have a closed curved shape or a mesh shape.

When a second geo-fence area including a second critical route among the at least one searched critical route and a third geo-fence area including a third critical route among the at least one searched critical route cross each other, the crossed second geo-fence area and third geo-fence area may be characterized as a single geo-fence area and set to the map.

Furthermore, according to embodiments of the present disclosure, a non-transitory computer readable medium containing program instructions for providing a geo-fence service using a map provided via a navigation device includes: program instructions that search for at least one critical route from a current position of a vehicle or an origin to a destination mapped onto the map; program instructions that display a first critical route onto the map along the vehicle can travel to the destination, the first critical route corresponding to a shortest route among the at least one searched critical route; and program instructions that determine whether the vehicle deviates from a geo-fence area including the at least one searched critical route.

Furthermore, according to embodiments of the present disclosure, a navigation device includes: a processor configured to search for at least one critical route from a current position of a vehicle or an origin to a destination mapped onto a map provided via the navigation device within a range of a target arrival time to the destination and to determine whether the vehicle deviates from a geo-fence area including the at least one searched critical route; and an information recognition unit configured to recognize input with respect to the destination and the target arrival time.

The navigation device may further include a wireless communication unit configured to receive the map from a synchronized server connected through a wireless network.

The information recognition unit may be further configured to receive the destination and the target arrival time input through a user interface or from a connected terminal through short range communication and recognize the received destination and the target arrival time. The processor may be further configured to set the recognized destination and target arrival time to the map.

The processor may be further configured to generate a warning, information about a position at which the vehicle deviates from the geo-fence area, and excess time information about an estimated time of arrival when the vehicle deviates from the geo-fence area.

The warning may be displayed on a display screen, and the information about the position at which the vehicle deviates and the excess time information about may be transmitted to the terminal.

The processor may be further configured to re-search for the at least one critical route for the vehicle when the vehicle deviates from the geo-fence area.

The geo-fence area may have a closed curved shape or a mesh shape.

when a first geo-fence area including a first critical route among the at least one searched critical route a second geo-fence area including a second critical route among the at least one searched critical route cross each other, the processor may be further configured to characterized the crossed first and second geo-fence areas as a single geo-fence area and set the geo-fence area to the map.

According to the above, it is possible to reduce unnecessary geo-fence area setting by setting areas surrounding at least one searched critical route as a real-time geo-fence area matched to the current situation. For example, it is possible to set and monitor a geo-fence area including at least one critical route in real-time instead of monitoring entry/exit with respect to a pre-set geo-fence area.

In addition, embodiments of the present disclosure can allow a vehicle to arrive at a destination within a target arrival time by automatically setting a geo-fence area within the target arrival time and notify a third person (e.g., guardian) of arrival at the destination within a scheduled time.

DETAILED DESCRIPTION OF THE DISCLOSURE

Figure 1:
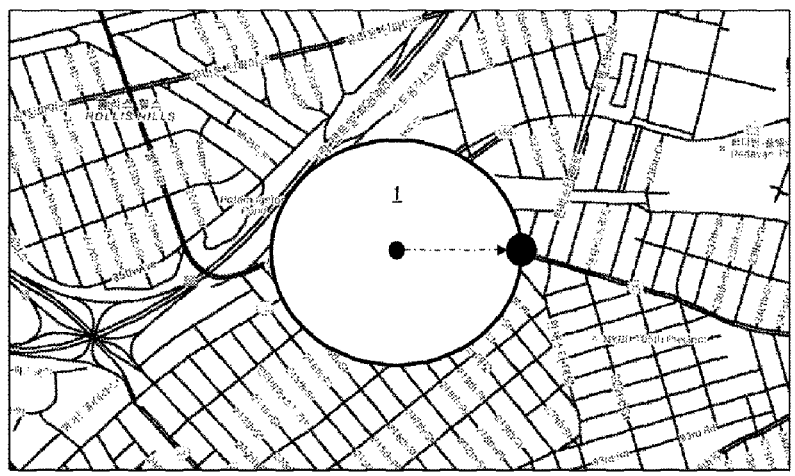
FIGS. 1 and 2 illustrate geo-fence areas set on a conventional map
Figure 2:
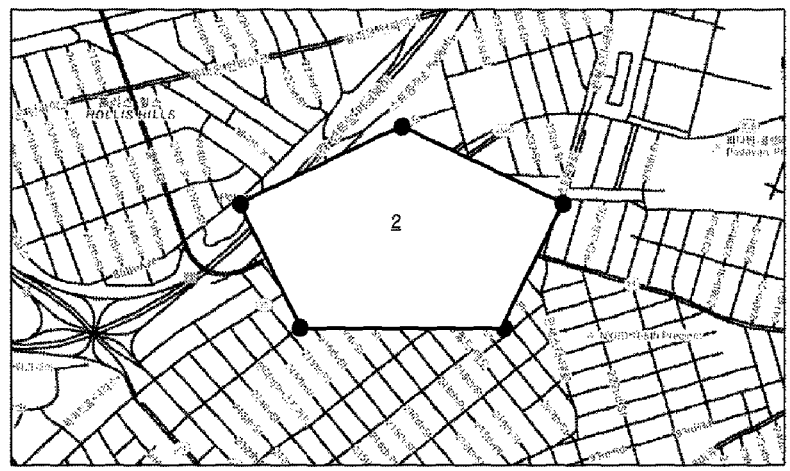

Reference will now be made in detail to the embodiments of the present disclosure, examples of which are illustrated in the accompanying drawings. The same reference numbers will be used throughout the drawings to refer to the same or like parts.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. Furthermore, the term "and/or" disclosed in the following embodiments includes any and all combinations of one or more of the associated listed items.

Although a suffix "module" or "unit" is used for constituent elements described in the following description, it is intended only for easy description of the specification. The suffix itself has no meaning or function to distinguish the constituent element using the suffix from the constituent element using no suffix.

It will be understood that the terms "comprises" and/or "comprising," or "includes" and/or "including", when used in this specification, specify the presence of stated components, but do not preclude the presence or addition of one or more other components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Hereinafter, a navigation device will be described in the following embodiments in which a mechanism receives a map in real-time from a synchronized server and sets a geo-fence area on the map or sets a geo-fence area on an automatically executed map.

A description will be given of setting of a geo-fence area and additional functions related thereto through various embodiments.

<Embodiments of Method for Providing Geo-fence Services>

Figure 3:
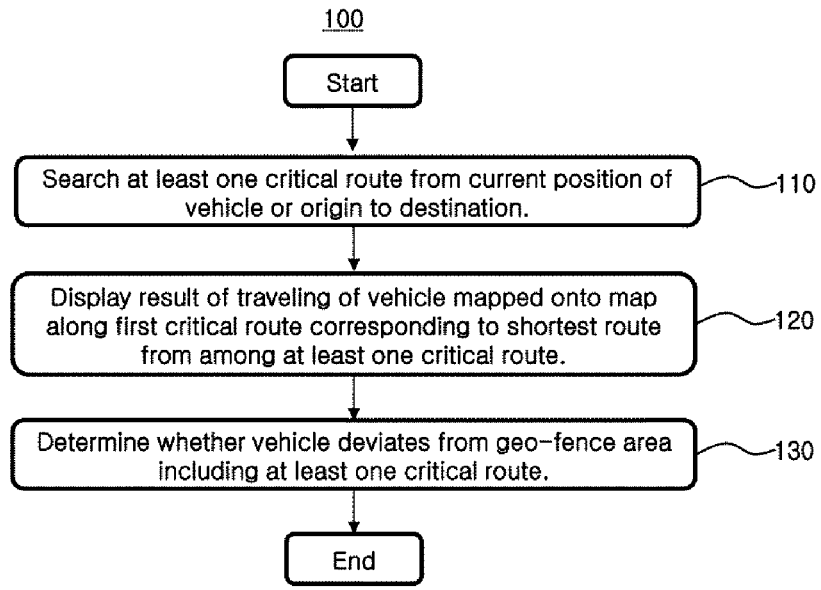
FIG. 3 is a flowchart illustrating an exemplary method for providing geo-fence services of a map according to embodiments of the present disclosure.
Figure 4:
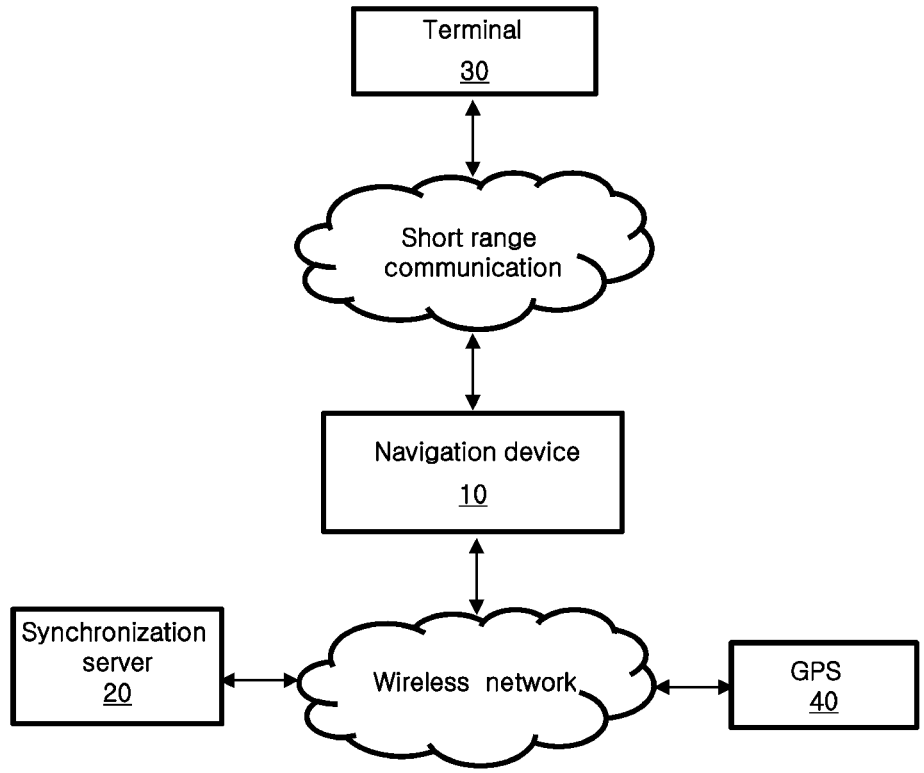
FIG. 4 illustrates a configuration of a navigation system performing the geo-fence services shown in FIG. 3.
Figure 5:
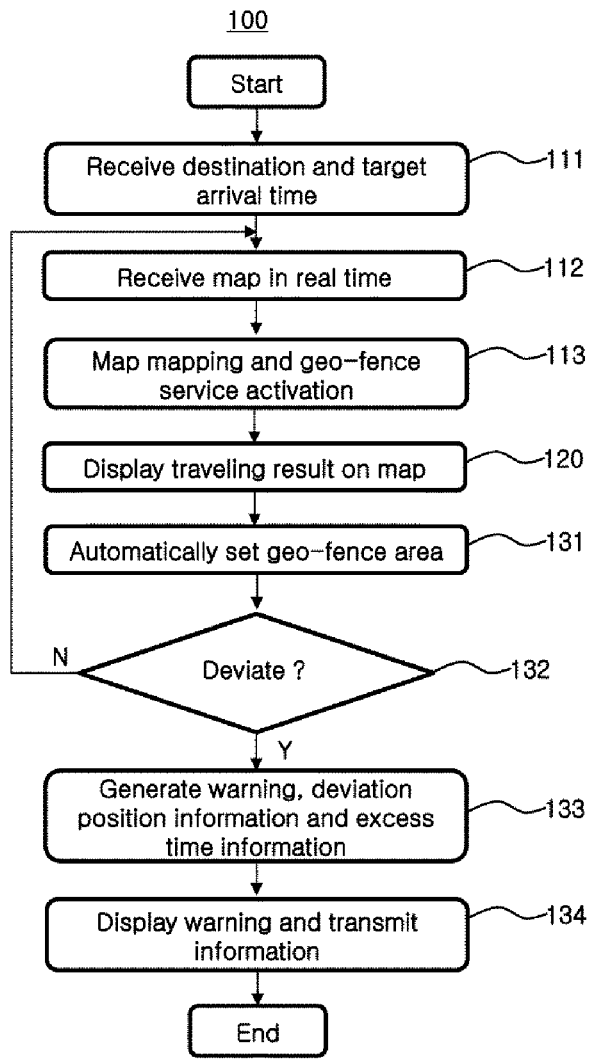
FIG. 5 is a flowchart illustrating the respective steps of the method shown in FIG. 3 in more detail.

FIG. 3 is a flowchart illustrating an exemplary method for providing geo-fence services of a map according to embodiments of the present disclosure, FIG. 4 illustrates a configuration of a navigation system performing the geo-fence services shown in FIG. 3 and FIG. 5 is a flowchart illustrating the respective steps of the method shown in FIG. 3 in more detail. FIGS. 4 and 5 are used to aid in describing FIG. 3.

As shown in FIG. 3, a method 100 according to embodiments of the present disclosure includes steps 110 to 140 for providing geo-fence services of a map through a navigation device 10.

The navigation device 10 is an entity of providing the geo-fence services of the map to users and may be connected to a synchronized server 20 through a wireless network, as shown in FIG. 4.

The wireless network may be part of various types of networks including a cellular network (e.g., GSM (Global System for Mobile Communications), EDGE (Enhanced Data Rates for GSM Evolution), GPRS (General Packet Radio Service), CDMA (Code Division Multiple Access), Time Division-CDMA (TD-CDMA), UMTS (Universal Mobile Telecommunications System), LTE (Long Term Evolution), or the like).

For example, a network data access element is a part of a GSM network, the network data access element can include one or more of a BTS (Base Transceiver Station), a BSC (Base Station Controller), an MSC (Mobile Switching Center), an SGSN (Serving GPRS Support Node) and the like. Alternatively, when the network data access element is a part of a LAN, the network data access element can include one or more of a network switch, a router, a hub, a modem, and the like.

Furthermore, the navigation device 10 may be connected to a terminal 30 through short range communication for input with respect to various settings for the geo-fence services, for example, a destination and a target arrival time. The terminal 30 may be a mobile terminal, for example a smartphone, a wireless notebook computer or a wearable device. However, the terminal 30 is not limited thereto.

Short range communication may be one of Bluetooth, RFID (Radio Frequency Identification), IrDA (Infrared Data Association), UWB (Ultra Wideband) and ZigBee.

The navigation device 10 can receive information on the current position of a vehicle from a GPS 40 frequently or in real-time.

Steps 110 to 140 for providing the geo-fence services of the map will now be described based on operation of the navigation device 10.

In step 110, the navigation device 10 may map the current position of the vehicle, an origin and a destination onto the map and then search at least one critical route from the current position of the vehicle or the origin to the destination. To this end, step 110 may include steps 111 to 114 of FIG. 5.

Specifically, in step S111, the navigation device 10 may receive information related to the geo-fence services and route setting of the map, for example, a destination and target arrival time, through a user interface. Alternatively, the navigation device 10 may receive information related to the geo-fence services and route setting of the map, for example, a destination and target arrival time, from a terminal 30 through short range communication.

In step 112, the navigation device 10 may receive a map from a synchronization server (or the synchronized server 20) through a wireless network. However, the navigation device 10 may use a map stored therein without receiving the map.

In step 113, the navigation device 10 may map the position information of the vehicle, received from the GPS 40, as well as the received destination and target arrival time onto the received map and activate the geo-fence services of the map when turned on.

Accordingly, the navigation device 10 can search for at least one critical route from the current position of the vehicle or the origin to the destination set on the activated map, in step 114.

The at least one critical route may be searched within the range of target arrival time to the destination mapped to the map and include a plurality of routes from the shortest critical route to the longest critical route.

In step 120, the navigation device 10 may display a first critical route corresponding to the shortest route from among the at least one searched critical route on a display screen and display a traveling route of the vehicle mapped onto the map along the first critical route displayed on the screen. The first critical route may refer to the shortest traveling route. Accordingly, the driver can frequently check the position of the vehicle on the map.

In step 130, the navigation device 10 determines whether the vehicle which is traveling has deviated from a geo-fence area including the at least one searched critical route. Step 130 may include steps 131 to 134 of FIG. 5.

In step 131, upon determination of the at least one searched critical route in step 110, the navigation device 10 may automatically set areas surrounding the at least one critical route as well as the at least one searched critical route as a geo-fence area. However, when the first critical route on which the vehicle is traveling needs to be changed according to traffic situation, the navigation device 10 may guide another critical route within the set geo-fence area.

Accordingly, the navigation device 10 may map the automatically set geo-fence area onto the activated map and determine whether the vehicle which is traveling has deviated from the mapped geo-fence area in step 132.

For example, when the vehicle deviates from the geo-fence area, the navigation device 10 can generate a warning, information on a position at which the vehicle deviates and excess time information about an estimated time of arrival, as shown in FIG. 5, in step 133. When the vehicle has not deviated from the geo-fence area, however, the navigation device 10 can perform step 112.

In step 134, the navigation device 10 may display the warning on the display such that the driver checks the warning and transmit the information on the position at which the vehicle deviates and the excess time information about the estimated time of arrival to the terminal 30 through short range communication. The terminal 30 may be carried by a guardian of the driver.

In this case, the guardian may check driving state of the driver, for example, their child, by checking the information on the position at which the vehicle deviates and the excess time information about the estimated time of arrival, which are displayed on the screen of the terminal 30. When the navigation device 10 determines that the vehicle has deviated from the geo-fence area, the at least one searched critical route may be re-searched for a critical route for the vehicle which is traveling.

Re-searching for a critical route may be searching within the range of the set geo-fence area. In this case, step 130 may be re-performed. Step 130 has been described above and thus description thereof is omitted.

As described above, the present embodiments can provide various advantages such as reducing unnecessary geo-fence area setting by setting at least one searched critical route and the surrounding area thereof as a real-time geo-fence area matched to the current situation.

<Embodiments of Geo-Fence Area>

Figure 6:
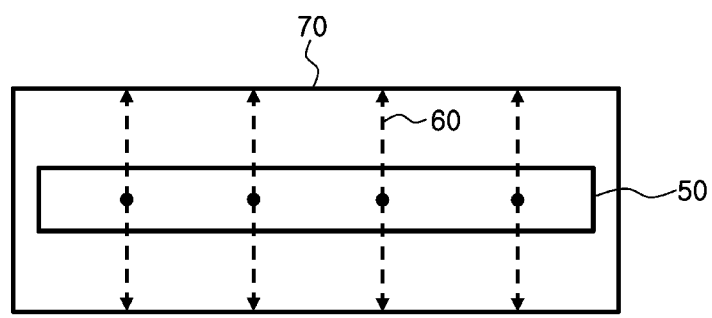
FIGS. 6 to 8 illustrate geo-fence areas mapped to the map shown in FIGS. 1 to 5.
Figure 7:
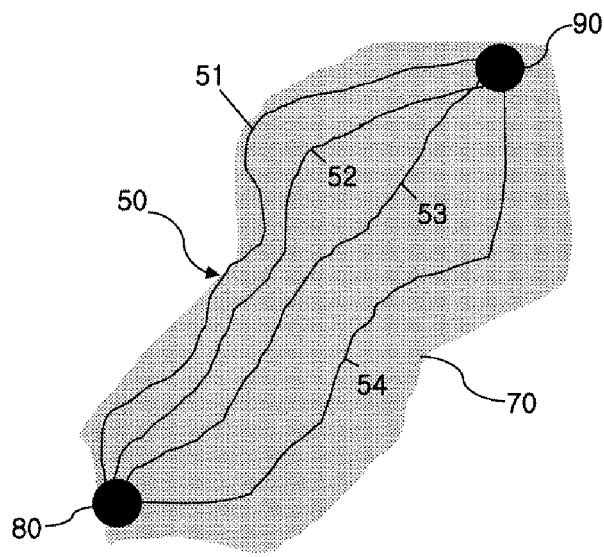
Figure 8:
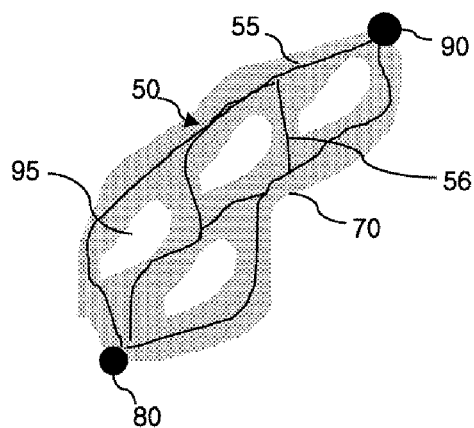

FIGS. 6 to 8 illustrate geo-fence areas mapped onto the map shown in FIGS. 1 to 5.

A geo-fence area 70 shown in FIG. 6 may include at least one searched critical route 50 and a predetermined area 60 surrounding the critical route 50.

A geo-fence area shown in FIG. 7 may have a closed curved shape including at least one critical route. For example, it is assumed that critical routes 50 shown in FIG. 7 include second, third, fourth and fifth critical routes 51, 52, and 54. In this case, since the geo-fence area 70 automatically set by the navigation device 10 includes critical routes present between the current position of the vehicle or an origin 80 to a destination 90 and areas surrounding the critical routes, the geo-fence area 70 may have a closed curved shape.

When a second geo-fence area including the second critical route 51 and a third geo-fence area including the third critical route 52 cross each other, for example, the crossed second and third geo-fence regions may be characterized as a single geo-fence area. The second and third geo-fence areas characterized as a single geo-fence area may be set by being mapped onto the map by the navigation device 10.

The geo-fence area 70 shown in FIG. 8 may take the form of a mesh including at least one critical route. Vacant regions 95 spaced apart from crossed critical routes 50 are excluded from the geo-fence area 70 automatically set by the navigation device 10. When a second geo-fence area including a second critical route 55 and a third geo-fence area including a third critical route 56 cross each other, for example, the crossed second and third geo-fence areas may be characterized as a single geo-fence area.

<Embodiments of Navigation Device>

Figure 9:
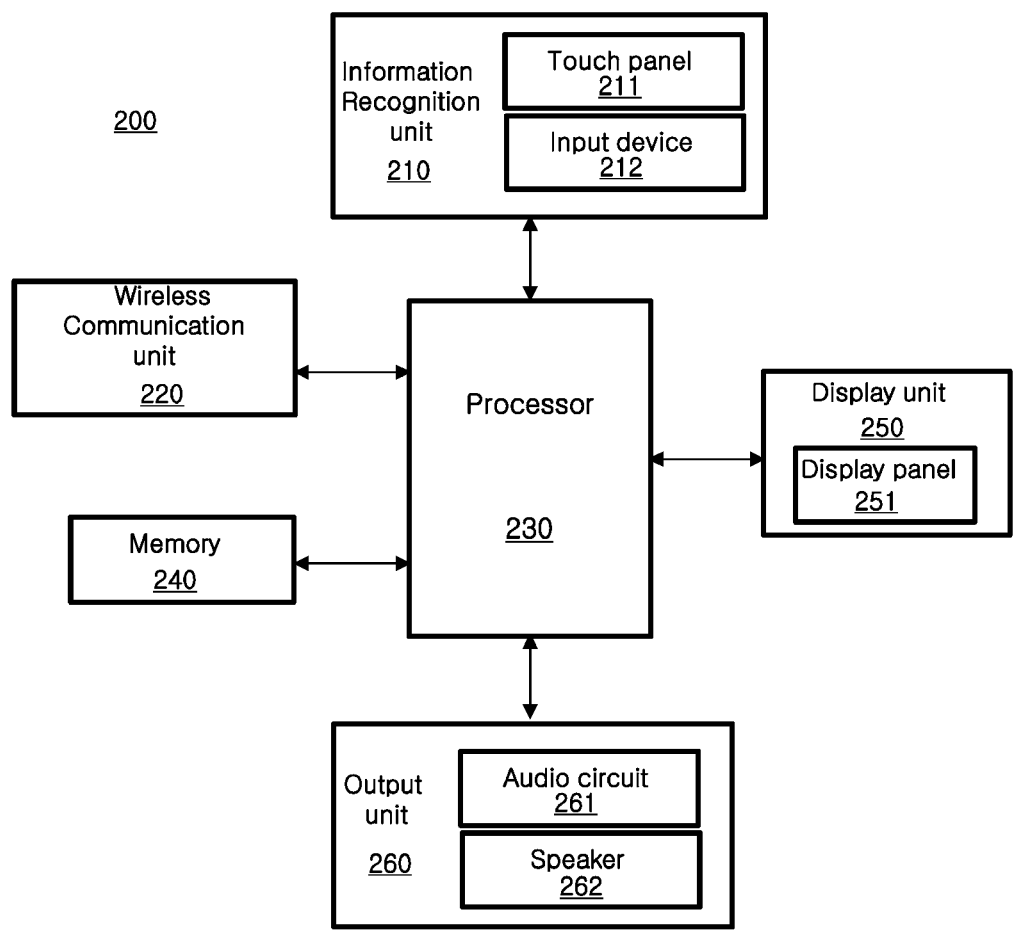
FIG. 9 is a block diagram of an exemplary navigation device according to embodiments of the present disclosure.

FIG. 9 is a block diagram of an exemplary navigation device according to embodiments of the present disclosure.

As shown in FIG. 9, a navigation device 200 may include an information recognition unit 210, a wireless communication unit 220, a processor 230 including at least one core, a memory 240, a display unit 250 and an output unit 260.

The information recognition unit 210 may include a touch panel 211 and/or an input device 212 related to a user interface.

The touch panel 211 may recognize touch operation related to an origin, target arrival time and the like of the geo-fence services (e.g., user operation of touching a touch sensitive surface or near the touch sensitive surface using a finger or an appropriate object or component, such as a touch pen) and, simultaneously, drive a related connecting device according to a predetermined program. The touch panel 211 may include at least one of a touch sensing means and a touch controller.

The touch sensing means senses a touch point of the user and detects a signal according to touch operation, simultaneously, and transmits corresponding touch information to the touch controller. The touch controller receives the touch information from the touch sensing means, converts the touch information into contact point coordinates, transmits the contact point coordinates to the processor 230, receives an instruction from the processor 230 and executes the instruction.

The input devices 212 may include at least one of a physical keyboard, function keys (e.g., a volume button, a switching button and the like), a trackball, a mouse, a joystick and the like for recognizing information related to an origin, target arrival time and the like of the geo-fence services. However, the input device 212 is not limited thereto and may be used as an assistance means of the touch panel 211.

Furthermore, the information recognition unit 210 may recognize a destination and target arrival time, received from the terminal through short range communication. Short range communication may be one of a wireless LAN, Wi-Fi, Bluetooth, ZigBee), WFD (Wi-Fi Direct), UWB (Ultra Wideband), IrDA (Infrared Data Association), BLE (Bluetooth Low Energy) and NFC (Near Field Communication).

The wireless communication unit 220 may receive a map from the synchronization server through a wireless network and/or receive position information of the vehicle from a GPS through a wireless network. To this end, the wireless communication unit 220 may have at least one of a serial network interface, a parallel network interface and a communication interface.

The communication interface may provide a communication link between the wireless communication unit 220 and the synchronization server and/or between the wireless communication unit 220 and the GPS for smooth transmission and reception of information between the wireless communication unit 220 and the synchronization server and/or between the wireless communication unit 220 and the GPS.

In embodiments of the present disclosure, the processor 230 may act as a control center for the navigation device 200 and is connected to components of the navigation device 200 via various interfaces and/or circuits. The processor 230 may execute a software program stored in the memory 240 and/or a module and calls data stored in the memory 240 so as to aid in executing various functions of the navigation device 200 and processing data of the navigation device 200. The software program may refer to a result obtained by encoding the method (i.e., geo-fence algorithm) related to the geo-fence services, described with reference to FIGS. 1 to 8.

For example, the processor 230 can search at least one critical route from the current position of the vehicle or an origin to a destination mapped onto the map within the range of target arrival time at the destination. To this end, the processor 230 can map not only a received destination and target arrival time but also vehicle position information received from the GPS onto the map received from the synchronization server or stored therein and activate the geo-fence services of the map when turned on. Accordingly, the processor 230 can search at least one critical route from the current position of the vehicle or the origin to the destination set to the activated map.

The at least one critical route can be searched for within the range of target arrival time at the destination mapped to the map and include a plurality of routes from the shortest critical route to the longest critical route.

Prior to searching critical routes, the processor 230 may map the destination, target arrival time and geo-fence area recognized by the information recognition unit 210 onto the map so as to set the destination, target arrival time and geo-fence area. Upon completion of setting of the destination, target arrival time and geo-fence area, the vehicle can travel on a critical route selected from searched critical routes.

While the vehicle is traveling on the selected critical route, the processor 230 may determine whether the vehicle has deviated from the geo-fence area including the at least one searched critical route. To this end, the processor 230 may automatically set areas surrounding the at least one critical route as well as the at least one searched critical route as a geo-fence area upon determination of the at least one searched critical route.

However, when the first critical route on which the vehicle is traveling needs to be changed according to traffic state, the processor 230 may guide another critical route within the set geo-fence area. Accordingly, the processor 230 can map the automatically set geo-fence area to the activated map and determine whether the vehicle has deviated from the mapped geo-fence area.

For example, when the vehicle has deviated from the geo-fence area mapped onto the map, the processor 230 can generate a warning and transmit the warning to the display unit 250 which will be described later.

In addition, when the vehicle deviates from the geo-fence area mapped onto the map, the processor 230 may generate information on a position at which the vehicle deviates and excess time information about an estimated time of arrival. The processor 230 may transmit the generated information on the position at which the vehicle deviates and the excess time information to the terminal 30 through short range communication.

Accordingly, the guardian can check driving state of the driver, for example, their child, by checking the information on the position at which the vehicle deviates and the excess time information about the estimated time of arrival, which are displayed on the screen of the terminal.

Furthermore, the processor 230 may re-search for critical routes for the vehicle traveling on the at least one searched critical route upon determining that the vehicle has deviated from the geo-fence area. Re-searching critical routes may be searching within the range of the set geo-fence area. It is possible to repeatedly check whether the vehicle has deviated from the geo-fence area according to a searched result. However, description thereof is omitted.

For the aforementioned processing, the processor 230 may selectively include one or more cores. For example, the processor 230 can include an operation processor and a modem processor for processing the aforementioned geo-fence services, which are integrated therein, and may include the memory 240 described below.

The operation processor may control data transmitted/received between components described above or below and process the aforementioned geo-fence services. The modem processor may process control related to wireless communication or short range communication. The modem processor may not be integrated with the processor 230.

In embodiments of the present disclosure, the memory 240 may store data processed by the information recognition unit 210, the wireless communication unit 220 and the processor 230, programs or the geo-fence algorithm. For example, the memory 240 can store the map, the position information of the vehicle, information set by the guardian, and a result processed by the processor 230.

The memory 240 may be at least one of a flash memory, hard disk, multimedia card micro type, card type (e.g. SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), magnetic memory, magnetic disk and optical disk.

In embodiments of the present disclosure, the display unit 250 may include a graphical user interface GUI in order to display information (e.g., destination, target arrival time and the like) input by the user, information (e.g., information on a position at which the vehicle deviates, excess time information and the like) provided to the user and/or information processed by the processor 230. The graphical user interface can be composed of figures, text, icons, video and combinations thereof.

The display unit 250 may include a display panel 251. The display panel 251 may be at least one of a liquid crystal display (LCD) and an organic light-emitting diode (OLED) display. While the touch panel 211 and the display panel 251 can be configured as two independent components to implement input and output functions, the touch panel 211 and the display panel 251 may be integrated to implement input and output functions.

The output unit 260 may include an audio circuit 261 and a speaker 262 for processing the result processed by the processor 230, for example, a warning, into voice and outputting the voice.

Details of the geo-fence area automatically set by the processor 230 are illustrated in FIGS. 5 to 8. FIGS. 5 to 8 have been described above and thus description thereof is omitted. However, the method of setting a geo-fence area illustrated in FIGS. 5 to 8 can be equally applied to the present embodiments.

For example, the processor 230 can automatically set a geo-fence area taking a closed curved shaped or a mesh shape including at least one critical route. When a first geo-fence area including a first critical route from among the at least one critical route and a second geo-fence area including a second critical route from among the at least one critical route intersect each other within the geo-fence area in the closed curved shape or mesh shape, the processor 230 can consider the crossed first and second geo-fence areas as a single geo-fence area and set the geo-fence area to the map. However, the present disclosure is not limited thereto and the method of setting a geo-fence area can be applied to geo-fence areas having shapes other than the closed curved shape or mesh shape.

As described above, the present embodiments can provide various advantages such as reducing unnecessary geo-fence area setting by setting at least one searched critical route and areas surrounding the same as a real-time geo-fence area matched to the current situation.

The aforementioned method for providing geo-fence services may be implemented as program instructions executed through various computer components and stored in a computer-readable recording medium.

The computer-readable recording medium may be an arbitrary medium accessible by a processor. Such a medium may include volatile and non-volatile media, removable and non-removable media, a communication medium, a storage medium and a computer storage medium.

The computer medium may include computer readable instructions, data structures, program modules and data of modulated data signals such as carriers or other transmission mechanisms and include arbitrary known information transfer media in other forms.

The storage medium may include a RAM, a flash memory, a ROM, an EPROM, EEPROM (Electrically Erasable Programmable Read Only Memory), a register, a hard disk, a removable disk, a CD-ROM (Compact Disk-Read Only Memory) or arbitrary known storage media in other forms.

The computer storage medium includes removable and non-removable media and volatile and non-volatile media which are implemented as a method or technology for storing computer readable instructions, data structures, program modules or information such as data.

The computer storage medium may include a hardware device specially configured to store and execute program instructions, such as a RAM, a ROM, an EPROM, an EEPROM, a flash memory, other solid-state memories, a CD-ROM, a DVD (Digital Versatile Disc), an optical storage device, a magnetic cassette, a magnetic tape, a magnetic disk storage device or the like.

Examples of program instructions may include not only machine language code such as code generated by a compiler but also high-level language code executable by a computer using an interpreter.

Although embodiments of the present disclosure have been described for illustrative purposes, those skilled in the art will appreciate that various modifications, additions and substitutions are possible, without departing from essential characteristics of the disclosure. Thus, embodiments disclosed herein are only exemplary and not to be considered as a limitation of the disclosure.

What is claimed is:
1. A method for providing a geo-fence service using a map provided via a navigation device, comprising:
searching for at least one route from a current position of a vehicle or an origin to a destination mapped onto the map;

displaying a first route onto the map along which the vehicle can travel to the destination, the first route corresponding to a shortest route among the at least one searched route; and determining whether the vehicle deviates from a geo-fence area including the at least one searched route, wherein the at least one route is searched within a range of a target arrival time to the destination, the geo-fence area is set according to the first route, and when the first route corresponding to the shortest route among the at least one searched route changes, the geo-fence area changes according to the changed first route.

2. The method according to claim 1, wherein the map is received from a synchronized server.

3. The method according to claim 1, wherein the destination and the target arrival time are input through a user interface and set to the map.

4. The method according to claim 1, wherein the destination and the target arrival time are received from a terminal through short range communication and set to the map.

5. The method according to claim 1, wherein the determining of whether the vehicle deviates from the geo-fence area comprises:

generating a warning, information about a position at which the vehicle deviates, and excess time information about an estimated time of arrival when the vehicle deviates from the geo-fence area.

6. The method according to claim 5, wherein:

the warning is displayed on a display screen, and the information about the position at which the vehicle deviates and the excess time information are transmitted to the terminal.

7. The method according to claim 5, further comprising re-searching for at least one route for the vehicle when the vehicle deviates from the geo-fence area.

8. The method according to claim 1, wherein the geo-fence area has a closed curved shape or a mesh shape.

9. The method according to claim 8, wherein, when a second geo-fence area including a second route among the at least one searched route and a third geo-fence area including a third route among the at least one searched route cross each other, the crossed second geo-fence area and third geo-fence area are characterized as a single geo-fence area and set to the map.

10. A non-transitory computer readable medium containing program instructions for providing a geo-fence service using a map provided via a navigation device, the computer readable medium comprising:

program instructions that search for at least one route from a current position of a vehicle or an origin to a destination mapped onto the map;

program instructions that display a first route onto the map along which the vehicle can travel to the destination, the first route corresponding to a shortest route among the at least one searched route; and program instructions that determine whether the vehicle deviates from a geo-fence area including the at least one searched route, wherein the at least one route is searched within a range of a target arrival time to the destination, the geo-fence area is set according to the first route, and when the first route corresponding to the shortest route among the at least one searched route changes, the geo-fence area changes according to the changed first route.

11. A navigation device, comprising:

a processor configured to search for at least one route from a current position of a vehicle or an origin to a destination mapped onto a map provided via the navigation device within a range of a target arrival time to the destination and to determine whether the vehicle deviates from a geo-fence area including the at least one searched route; and an information recognition unit configured to recognize input with respect to the destination and the target arrival time, wherein the geo-fence area is set according to a first route corresponding to shortest route among the at least one searched route, and when the first route corresponding to the shortest route among the at least one searched route changes, the geo-fence area changes according to the changed first route.

12. The navigation device according to claim 11, further comprising a wireless communication unit configured to receive the map from a synchronized server connected through a wireless network.

13. The navigation device according to 11, wherein the information recognition unit is further configured to receive the destination and the target arrival time input through a user interface or from a connected terminal through short range communication and recognize the received destination and the target arrival time, wherein the processor is further configured to set the recognized destination and target arrival time to the map.

14. The navigation device according to claim 11, wherein the processor is further configured to generate a warning, information about a position at which the vehicle deviates from the geo-fence area, and excess time information about an estimated time of arrival when the vehicle deviates from the geo-fence area.

15. The navigation device according to claim 14, wherein:

the warning is displayed on a display screen, and the information about the position at which the vehicle deviates and the excess time information about are transmitted to the terminal.

16. The navigation device according to claim 14, wherein the processor is further configured to re-search for the at least one route for the vehicle when the vehicle deviates from the geo-fence area.

17. The navigation device according to claim 11, wherein the geo-fence area has a closed curved shape or a mesh shape.

18. The navigation device according to claim 17, wherein, when a first geo-fence area including a first route among the at least one searched route a second geo-fence area including a second route among the at least one searched route cross each other, the processor is configured to characterized the crossed first and second geo-fence areas as a single geo-fence area and set the geo-fence area to the map.

* * * * *